June 16, 1925.

L. PENWELL 1,542,719

TIRE CHAIN CARRIER

Filed Oct. 31, 1923

Inventor

Lewis Penwell,

By Wilkinson & Giusta

Attorneys

June 16, 1925.  1,542,719
L. PENWELL
TIRE CHAIN CARRIER
Filed Oct. 31, 1923   2 Sheets-Sheet 2
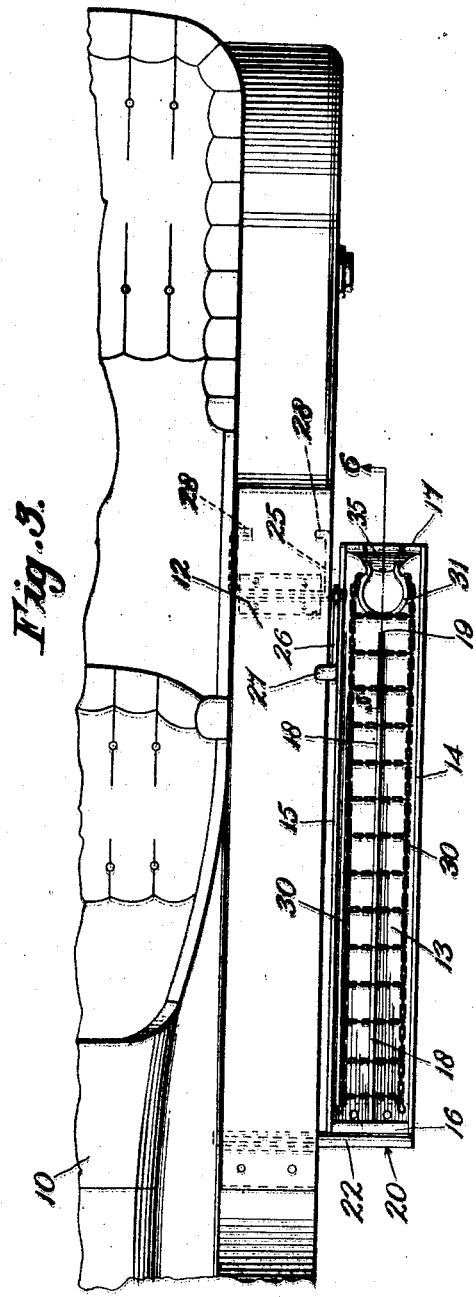
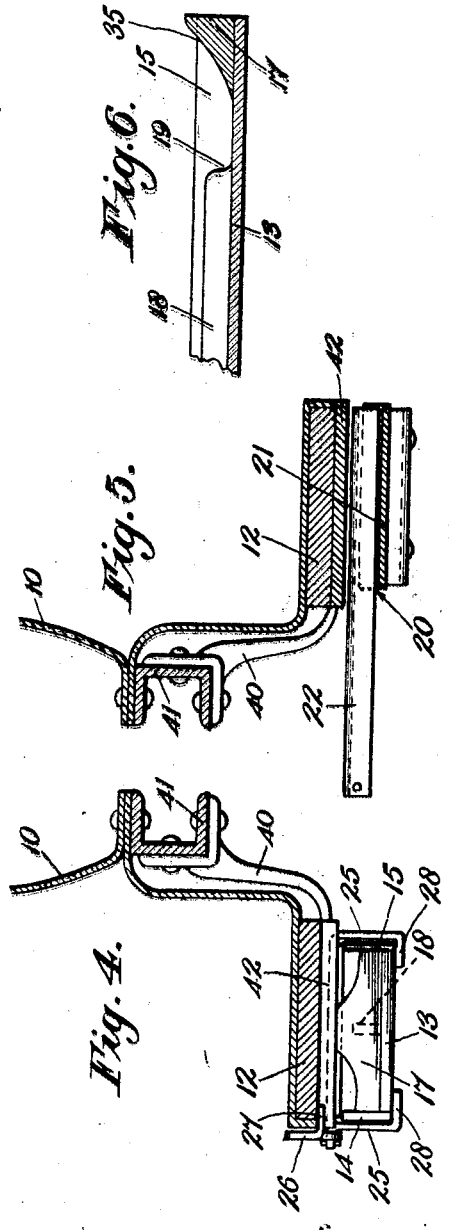
Inventor
Lewis Penwell,
By Wilkinson & Giusta
Attorneys Patented June 16, 1925.

1,542,719

UNITED STATES PATENT OFFICE.

LEWIS PENWELL, OF HELENA, MONTANA, ASSIGNOR TO LEWIS FRED PENWELL, OF HELENA, MONTANA.

TIRE-CHAIN CARRIER.

Application filed October 31, 1923. Serial No. 671,954.

*To all whom it may concern:*

Be it known that I, LEWIS PENWELL, a citizen of the United States, residing at Helena, in the county of Lewis and Clark and State of Montana, have invented certain new and useful Improvements in Tire-Chain Carriers; and I do hereby declare the following to be a full, clear, and exact description of the invention, such as will enable others skilled in the art to which it appertains to make and use the same.

This invention relates to automobile tire chain carriers, and has for its principal object to provide means for storing and carying the well known anti-skid chains, which are in wide use today, on automobile tires for the prevention of skidding.

A further object of the invention is to provide a tire chain carrier in which the chains may be stowed with facility, and from which they may be readily removed and applied to their respective wheels with the minimum amount of labor and loss of time.

A still further object of the invention is to provide a tire chain carrier located preferably beneath the step or running board of the vehicle, in which the chains may be placed in a substantially flat position. The said chains are provided with a suitable clamp, and, as will be more fully hereinafter described, they may be readily extracted from the carrier by merely clamping one end of the chain around the tire and then moving the vehicle a short distance over the roadway.

With the above and other objects in view, which will appear as the description proceeds, the invention consists in the novel details of construction, combinations and arrangements of parts, more fully hereinafter disclosed, and particularly pointed out in the appended claims.

Referring to the accompanying drawings, forming a part of this specification in which like characters designate like parts in all the views:

Fig. 3 is a fragmentary plan view of the vehicle, showing the carrier in position to receive the chain after it has been removed from the wheel and is replaced in the carrier;

Fig. 4 is an enlarged cross-sectional view, partly in elevation, taken approximately on the plane indicated by the line 4—4 of Fig. 1, looking in the direction of the arrows;

Fig. 5 is a view similar to Fig. 4, taken approximately on the plane indicated by the line 5—5 of Fig. 1, looking in the direction of the arrows; and, Fig. 6 is a fragmentary vertical sectional view of one end of a carrier taken approximately on the plane indicated by the line 6—6 of Fig. 3.

Figure 1:
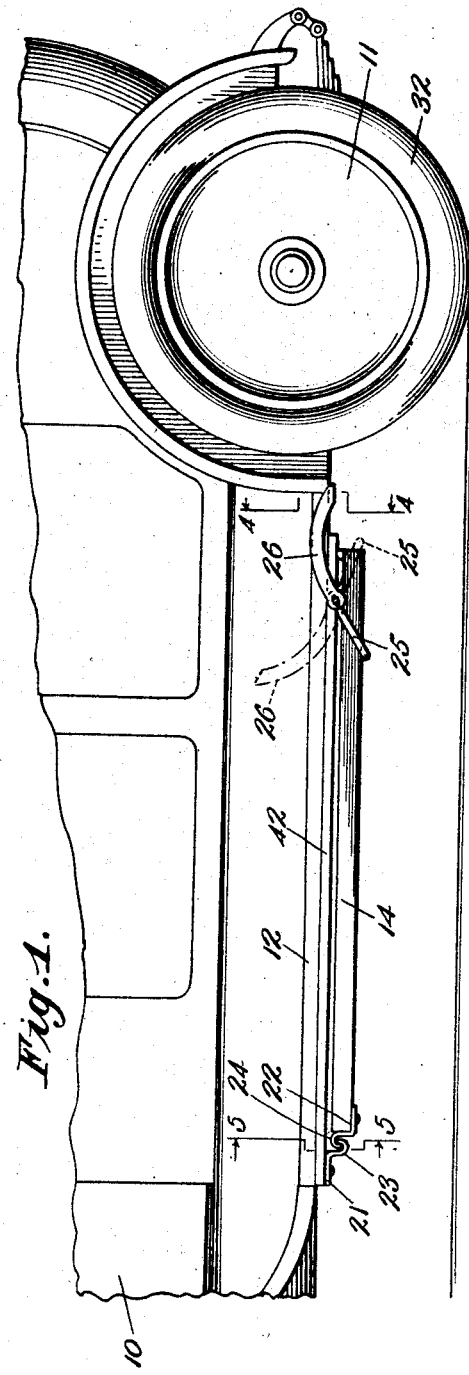
Figure 1 is a fragmentary side elevational view of an automobile provided with a tire chain carrier and constructed in accordance with the present invention, the parts being in the positions normally occupied when the chains are stored away.

In the said drawings, the numeral 10 indicates generally a motor vehicle provided with the usual rear wheels 11 and the steps or running boards 12. As above stated, the present invention contemplates the provision of a carrier located beneath the said steps or running boards 12, and as here illustrated, the said carrier comprises a substantially rectangular board or plate 13, horizontally hinged to the under side of the step 12, and provided with the side members, 14 and 15, and the end members, 16 and 17, and having a centrally disposed longitudinal rib 18, which extends from the end member 16, to a point 19 somewhat spaced from the end member 17, as will be clear from Figs. 3 and 6.

The hinge 20, by means of which the carrier is pivotally secured to the running board, as above described, may be of any suitable construction, but it is preferably so made as to permit of relative lateral movement of the carrier board 13 as well as of swinging movement in a vertical plane.

One form of construction is illustrated in the drawings as comprising the complementary hinge members 21 and 22, rigidly secured respectively to the under side of the running board 12 and to the plate 13, and provided with the reversely bent interengaging portions 23 and 24, as will be readily understood. Such a construction will not only permit of the vertical swinging movements of the carrier plate 13, and its associated parts, but it will also permit of the said carrier being moved laterally from beneath the running board to the position shown in Fig. 3, to facilitate the replacing of the chains in the carrier after they have been removed from the wheels.

In order to maintain the carrier in its upper or normal position, any suitable form of catch, latch or other securing means may be provided. I have here shown the securing means as comprising a substantially C-shaped member 25, journally mounted beneath the step or running board 12, and provided with a resilient handle 26 rigidly secured thereto, by means of which the said member 25 may be oscillated from its full line position to its dotted line position, as shown in Fig. 1, and vice versa. When in its full line position, as illustrated in said figure, the extreme bent end 27 of the handle 26 snaps beneath the running board 12, and serves as a spring catch to prevent displacement of the parts; while when moved to the broken line position shown, the extreme bent ends 28 of the C-shaped member 25 are entirely disengaged from the carrier board 13, thus permitting the carrier to be dropped on its hinge 20, and slid sidewise to the position shown in Fig. 3, for replacement of the chains.

Figure 2:
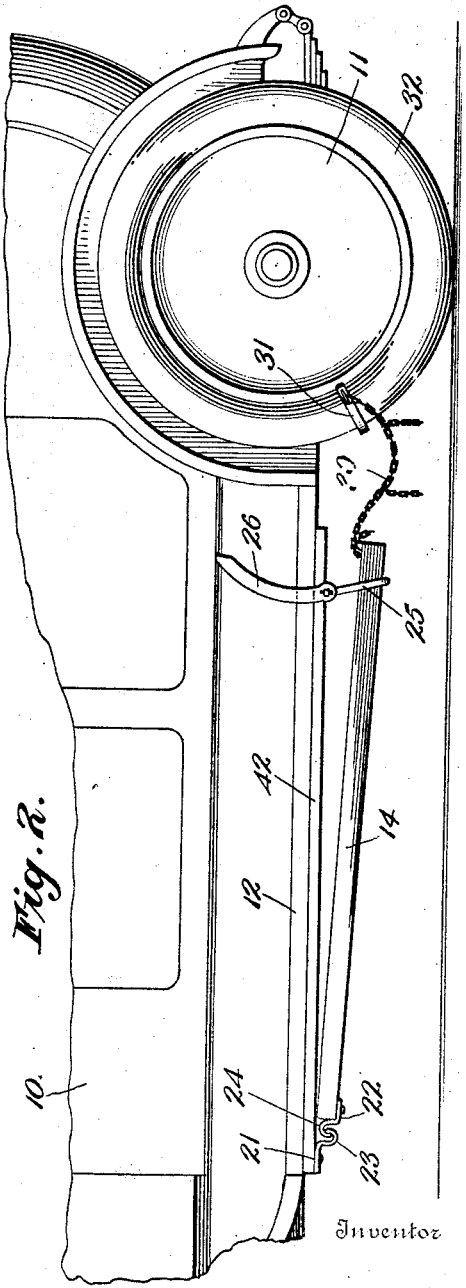
Fig. 2 is a view similar to Fig. 1, illustrating the manner in which the chains may be applied to the rear wheels of the vehicle.

The carrier may of course be employed to receive the usual and well known type of anti-skid chain, but its peculiar construction particularly adapts it to use with chains which are provided with suitable spring clamps or other securing means for facilitating the application of the chains to the wheels. As shown in Figs. 2 and 3, the chains 30 may be provided at one end with the spring clamp 31, which is of substantially horse-shoe shape, and of such dimensions as to frictionally engage the circumference of the pneumatic or other tire 32 with which the wheel 11 is provided.

It thus results that when it is desired to apply the tire chains, it is only necessary to drop the carrier 13 from the position illustrated in Fig. 1, to that shown in Fig. 2, whereupon it is comparatively easy to grasp the right hand end of the chain and to partially withdraw the same, to permit the clamp 31 to be sprung about the tire, as indicated in Fig. 2. In this position, if the car is moved over the roadway until the rear wheel has made a substantially complete revolution, the chain will be drawn from the carrier by such movement and will be automatically positioned about the tire. It is then a comparatively easy matter to connect the hooks or detachable links with which the ends of the chains are usually provided, whereupon the carrier may be returned to its initial position and the car proceed with the chains in operative position.

It will be noted in this connection that should the machine become stuck in mud, sand or the like, where it is very disagreeable, if not impossible, to apply tire chains in the usual manner, and where the rear wheels will spin without moving the car, with the present invention it is a comparatively easy matter to apply the chains, for the spring clamp 31 need only be snapped about the tires and the clutch let in, whereupon any spinning of the rear wheels will draw the chains from the carriers and wrap them around the tires, and thus enable the said wheels to secure the necessary traction to pull the car out of the mud. The application of the chains in this manner may be readily accomplished without unduly soiling the hands and clothes of the operator, as will be readily understood.

It will also be noted that the longitudinally extending plate or rib 18, with which the carrier plate 13 is provided, will maintain the side chains in spaced relative substantially straight position, as shown in Fig. 3, thereby preventing the tangling of the chains and facilitating the withdrawal thereof from the carrier in the manner above described. This withdrawal is also facilitated by the fact that the end wall 17 is shaped substantially as shown in Figs. 4 and 6, with its inner edge 35 rounded or bevelled substantially as shown, and its side portions cut away, as will be clear from Fig. 4. This construction furthermore facilitates the application of the chains to the wheels by the car movement, as above described.

When the need for the use of chains is past, and it is desired to again store them in the carrier, it is only necessary to remove the chains from the tires in the usual manner by hand, and to drop the carrier entirely, by moving the resilient handle 25 from its full line to its broken line position as shown in Fig. 1. The carrier is then moved laterally from beneath the running board, as shown in Fig. 3, whereupon the chains may be readily deposited within the carrier, which may then be returned to its normal position and locked by means of the handle 26.

In most automobiles the steps or running boards 12 are supported by brackets 40, secured to the frame chassis 41, and extending beneath the said steps 12. In order to provide a smooth surface against which the carrier 13 may rest when in its uppermost position, I prefer to provide a filler board or member 42, secured beneath the steps 12 and suitably recessed to accommodate the horizontal step supporting portions of the brackets 40. In this manner a smooth surface may be obtained beneath the steps 12 against which the carrier 13 may be raised and maintained by the member 25, as will be readily understood.

While one form of the invention has been illustrated and described, it is obvious that those skilled in the art may vary the details of construction as well as the arrangement of parts without departing from the spirit of the invention, and therefore it is not wished to be limited to the above disclosure except as may be required by the accompanying claims.

What is claimed is:

1. The combination with the step of a vehicle of a tire chain carrier receptacle horizontally pivotally secured at one end to the under surface of said step in alignment with the rear wheel, the pivotal securing means also permitting of lateral sliding displacement of said receptacle in a path parallel to the axis of the pivot.

2. The combination with the step of a vehicle of a tire chain carrier receptacle horizontally pivotally secured at its forward end to the under surface of said step in alignment with the rear wheel, the pivotal securing means also permitting of lateral sliding displacement of said receptacle in a path parallel to the axis of the pivot; said receptacle being of a length sufficient to receive a tire chain in its extended flat condition, and being provided with a central longitudinal dividing rib; and means for preventing pivotal and lateral movements of said receptacle.

3. The combination with the step of a vehicle of a tire chain carrier receptacle pivotally secured to the under surface of said step, the pivotal securing means also permitting of lateral displacement of said receptacle; and means comprising substantially C-shaped member, having a resilient locking handle, for preventing pivotal and lateral movements of said receptacle.

4. A carrier for automobile tire chains comprising a receptacle having its forward end horizontally pivotally and laterally slidably secured beneath the step of the automobile, said lateral movement being in a path parallel to the axis of the pivot, said receptacle being provided with a longitudinally extending dividing rib.

5. A carrier for automobile tire chains comprising a receptacle having its forward end horizontally pivotally secured beneath the step of the automobile, said receptacle being of a length to receive a tire chain in its flat extended condition, and having its rear end provided with a wall having a bevelled edge to facilitate the withdrawal of the chain.

6. A carrier for automobile tire chains comprising a receptacle having its forward end horizontally pivotally and laterally slidably secured beneath the step of the automobile, said lateral movement being in a path parallel to the axis of the pivot, said receptacle being arranged in alignment with the rear wheel and having its rear end provided with a wall having a raised center portion and a bevelled edge to facilitate the withdrawal of the chain.

7. A carrier for automobile tire chains comprising a receptacle adapted to be pivotally secured beneath the step of the automobile, said receptacle being provided with a central longitudinally extending dividing rib and with an end wall having a raised center portion and a bevelled edge to facilitate the withdrawal of the chain.

8. A carrier for automobile tire chains comprising a receptacle adapted to be pivotally secured beneath the step of the automobile, said receptacle being provided with a central longitudinally extending dividing rib and with an end wall having a raised center portion and a bevelled edge to facilitate the withdrawal of the chain, said rib being cut away adjacent said end wall to accommodate a securing means carried by said chain.

LEWIS PENWELL.